United States Patent

[11] 3,539,204

| [72] | Inventor | Theodore F. Keller |
| --- | --- | --- |
| | | 3400 Montrose, Houston, Texas 77006 |
| [21] | Appl. No. | 726,444 |
| [22] | Filed | May 3, 1968 |
| [45] | Patented | Nov. 10, 1970 |

[54] CLIP BOARD FOR A SHOPPING CART
1 Claim, 3 Drawing Figs.

[52] U.S. Cl. ..................................... 281/45, 40/10
[51] Int. Cl. ..................................... B42f 1/02
[50] Field of Search ........................... 281/45, 15B; 40/308; 24/67.09, 67.11, 81(all); 108/52

[56] References Cited
UNITED STATES PATENTS

| 1,256,498 | 2/1918 | Baker | 108/52X |
| 1,344,498 | 6/1920 | Fox | 281/15(B)UX |
| 1,478,880 | 12/1923 | Otterbein | 281/15(B)UX |
| 2,731,764 | 1/1956 | Zeller | 281/15(B)UX |
| 2,888,761 | 6/1954 | Miller | 40/308 |
| 3,212,794 | 10/1965 | Crossman et al. | 281/45X |

*Primary Examiner*—Jerome Schnall
*Attorney*—R. Werlin

ABSTRACT: A clip board for attachment to a shopping cart for holding grocery lists and the like, the board comprising a composite unitary structure formed by extrusion of a thermoplastic material, and including as integral parts thereof a panel board, a clip for securing the board to a cart member, a flexible lip for resiliently clamping a paper to the board, and a receptacle for a pencil or the like.

Patented Nov. 10, 1970

3,539,204

T. F. Keller
INVENTOR.

BY

ATTORNEY

CLIP BOARD FOR A SHOPPING CART

The primary objects of this invention are to provide a clip board which may be readily attached to a shopping cart for securely holding a shopping list or the like in a position for easy viewing and access by the user; which is constructed as a composite unitary structure by extrusion of a suitable thermoplastic material, in which the extruded structure includes as integral parts thereof novel clip elements which serve to removably secure the board to the cart and which serve to grip a shopping list or the like supported on the board, and a receptacle for a pencil or the like; and which may be manufactured cheaply.

Other and more specific objects and advantages of this invention will become more readily apparent from the following detailed description when read in conjunction with the accompanying drawing which illustrates a useful embodiment in accordance with this invention.

Figure 1:
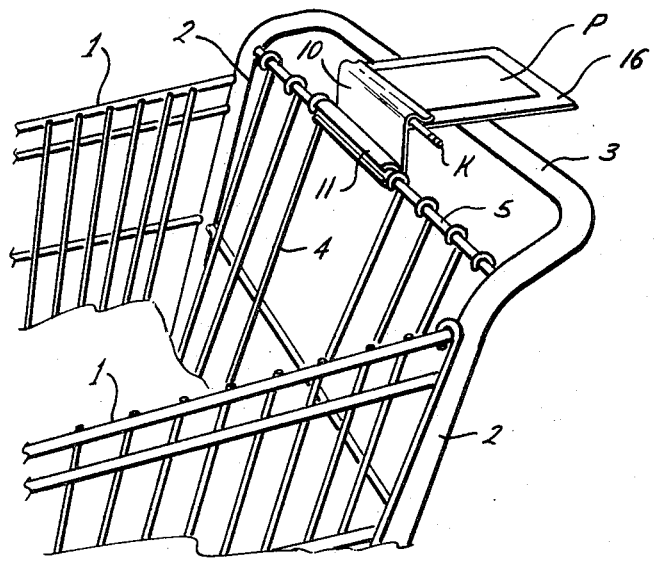
FIG. 1 is a view, in perspective, showing the clip board mounted on a shopping cart.

Referring to the drawing there is shown in FIG. 1, the rear portion of a conventional grocery shopping cart, designated generally by the letter C, having barred side panels 1–1 secured to a generally U-shaped tubular rear frame consisting of upstanding sidepieces 2–2, the upper ends of which are bent rearwardly and connected together to form the horizontal pusher bar or handle 3.

In carts of the conventional design illustrated, a barred rear panel 4 is secured to a transverse pivot rod 5, the ends of which are journaled in the sidepieces at a point somewhat below and forwardly of handle 3. The rear panel may thus be swung forward to permit nesting with other carts in the well-known manner.

Figure 2:
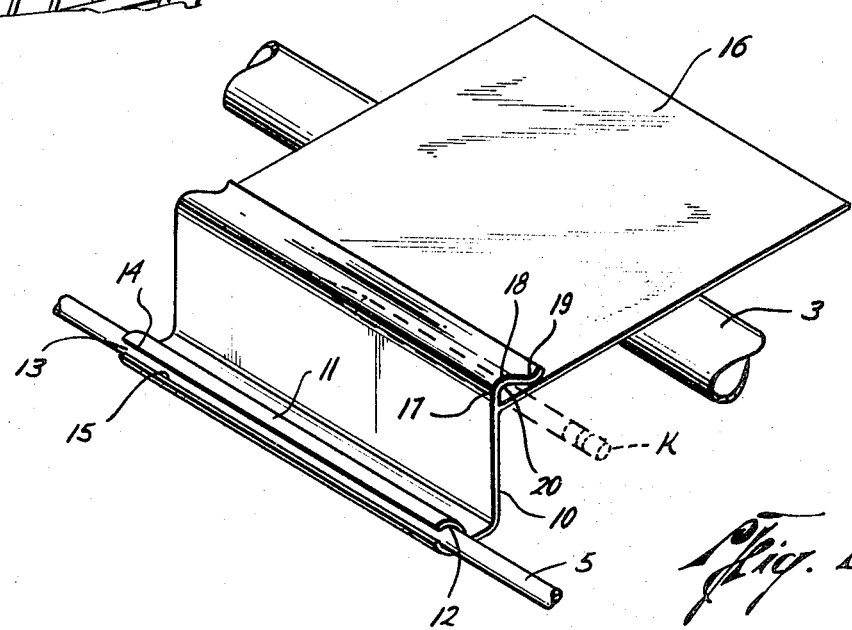
FIG. 2 is an enlarged view, in perspective, of the clip board.
Figure 3:
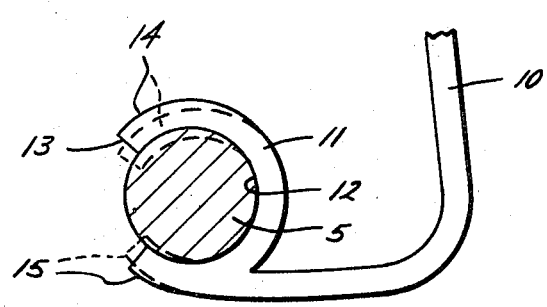
FIG. 3 is a side elevation of the attachment clip portion of the device.

The clip board in accordance with this invention comprises a composite structure formed in one piece by extrusion of a suitable known thermoplastic material through a die of appropriate shape. As so formed the clip board, as best seen in FIGS. 2 and 3, comprises a flat rectangular riser section 10. The lower longitudinal margin of the inner section is formed to define a forwardly projecting generally tubular clip 11 having a bore 12 and a slot 13 extending longitudinally throughout the length of the clip and opening to the exterior thereof. The slot is defined by spaced lips 14—15 which will have sufficient flexibility to permit them to be spread apart sufficiently to allow the clip to be forced over pivot rod 5 (FIG. 3) and to then retract so as to clamp tightly about the rod when the latter is fully inserted in bore 12.

Riser 10 merges along its upper margin with a rearwardly extending flat rectangular panel 16 of the same width as riser 10. The height of riser 10 will be made such as to extend from rod 5 to just above handle 3 and panel 16 will be made long enough to extend rearwardly past handle 3 which will serve as a firm support for the panel.

The upper margin of riser 10 will also be formed to provide a flange 17 which extends above panel 16, and has a convexly curved portion 18 which turns rearwardly and downwardly to define along its rearward margin an upwardly curving lip 19. The curved flange and lip will function as a spring clip biased toward the surface of panel 16 so as to securely grip a sheet of paper P (FIG. 1), such as a grocery list, which is inserted between panel 16 and lip 19.

The curved portion 18 is so shaped as to cooperate with the opposed portion of panel 16 to define a tubular receptacle 20 adapted to receive a pencil K or like marking device, so that it may readily be inserted and removed as required by the user.

As will be evident from the foregoing, the described clip board constitutes a simple one-piece structure which can be easily attached to a shopping cart and will be firmly supported thereon, so that the user will have a solidly mounted, readily accessible support for a grocery list or the like, which will be in full view, and on which writing may be readily and easily done.

As noted, the clip board may be constructed of any suitable and well-known thermoplastic material which lends itself to extrusion through a suitably formed die whereby the entire device can be formed as a unitary structure. In practice, the extrusion will be in the form of an elongate web having the cross-sectional shape, as seen in side view in FIG. 2. This web may then be cut at selected points to form clip boards of any desired width but of identical cross-sectional configuration. This provides a very low cost of manufacture per unit, since no assembly operations of any type will be involved. Some finishing of rough edges and corners may be performed if found desirable.

As noted there are numerous thermoplastic materials commercially available which are adapted for making the desired extrusions having the desired degree of stiffness as well as the limited flexibility required for the functioning of clip 11 and lip 19. Conventional plastic materials suitable for this purpose include: cellulose butyrate acetate, cellulose acetate, cellulose propionate, styrene polymers, acrylic polymers and combinations.

The clip boards may be made of transparent plastic or may be colored, as desired.

It will also be evident that the clip boards may be made to carry advertising material and the like.

It will be understood that changes and modifications may be made in the details of the illustrative embodiment within the scope of the appended claims but without departing from the spirit of this invention.

I claim:

1. A clip board for a shopping cart having a transverse pivot rod swingably supporting a rear cart panel and a pusher bar mounted above and rearwardly of said pivot rod, comprising a composite one-piece structure formed by extrusion from a thermoplastic material to include:
   i. a flat generally rectangular riser section having a vertical height to extend from the pivot rod to just above said pusher bar;
   ii. the lower horizontal margin of said riser section being formed to define a generally tubular clip having a longitudinal slot, the edges of which are resiliently spreadable whereby to receive and resiliently grasp said pivot rod;
   iii. said riser section merging at its upper margin into a rectangular panel of substantially the same width as said riser section disposed to extend rearwardly over said pusher bar for support thereon;
   iv. said upper margin of the riser section being formed to provide a flange extending above said panel and curved rearwardly and downwardly to define at its rearward margin a springy lip element parallel to upper margin biased against the upper surface of said panel for grasping therebetween a sheet of paper and the like;
   v. the portion of the flange between said upper margin and said lip element having a curvature cooperating with the opposed portion of the panel to define therebetween a generally tubular receptacle for a pencil or the like.